United States Patent [19]
Koerner et al.

[11] 3,775,742
[45] Nov. 27, 1973

[54] VEHICLE DETECTION SYSTEM

[75] Inventors: Ralph J. Koerner, Canoga Park; John E. Higbee, Simi Valley; Martin C. Henderson, Canoga Park, all of Calif.

[73] Assignee: Canoga Controls Corporation, Canoga Park, Calif.

[22] Filed: Sept. 18, 1972

[21] Appl. No.: 290,127

[52] U.S. Cl. ............................................. 340/38 L
[51] Int. Cl. .......................................... G08g 1/097
[58] Field of Search ...................... 340/38 L, 258 C

[56] References Cited
UNITED STATES PATENTS
3,714,626   3/1971   Koerner ........................... 340/38 L

*Primary Examiner*—William C. Cooper
*Attorney*—Samuel Lindenberg et al.

[57] ABSTRACT

A system for detecting vehicles and suitable for use in conjunction with other equipment for traffic monitoring and control. The system includes one or more sensors capable of measuring and indicating magnetic field intensity and a central electronic unit which interprets the output signals produced by the sensors. The sensors preferably comprise flux gate magnetometers. The system can be operated in either of two modes; i.e. a "between lanes" mode (I) in which each sensor is mounted adjacent to a lane being monitored and an "in lane" mode (II) in which each sensor is mounted in a lane being monitored. In mode I the central unit produces a detect output signal in response to a magnetic field intensity reduction, as would be caused by a vehicle passing in a monitored lane, which exceeds a first threshold level. In mode II, the detect output signal is produced in response to a sensed magnetic field intensity increase, as would be caused by a vehicle passing in a monitored lane, which exceeds a second threshold level. Both the first and second threshold levels are established as some percentage of the ambient magnetic field intensity. A bias signal, developed as a function of the sensed ambient field intensity, is fed back to the sensors to null their output under quiescent conditions, thus enabling the system to automatically adapt to different ambient field conditions. Time delay means are incorporated in the feed back loop producing the bias signal to prevent the system from adapting to short term magnetic field changes.

21 Claims, 12 Drawing Figures

VEHICLE DETECTION SYSTEM

BACKGROUND OF THE INVENTION

This invention relates generally to vehicle detection systems useful in traffic monitoring and control applications and more particularly to a vehicle detection system responsive to changes in magnetic field intensity produced by a vehicle.

Various vehicle detection systems are known which rely for detection on magnetic field intensity variations produced by a vehicle. For example, see U.S. Pat. Nos. 3,249,915 and 3,649,958, and U.S. Pat. application Ser. No. 125,724, filed Mar. 18, 1971, now U.S. Pat. No. 3,714,626.

Application Ser. No. 125,724 discloses a vehicle detection system suitable for traffic applications (see FIG. 13) in which sensors are mounted in the pavement along a lane boundary line. When a vehicle passes the sensor in a lane adjacent thereto, it produces a reduction in magnetic field intensity at the sensor thus causing a corresponding deviation in the sensor output signal. The sensor output signal is coupled to a central electronic unit which then makes the decision as to whether or not the signal deviation corresponds to that normally produced by a vehicle, and if the decision is affirmative, a detect output signal is generated.

The present invention is directed to a vehicle detection system which in operational mode I is similar to the system disclosed in Ser. No. 125,724 but differs therefrom primarily in the manner of determining whether or not deviations in the sensor output signals constitute a vehicle.

SUMMARY OF THE INVENTION

An object of the present invention is to provide an improved system for detecting the passage of a vehicle along a monitored traffic lane.

A system in accordance with the present invention employs one or more sensors, each preferably a flux gate magnetometer, and a central electronic unit which responds to the sensors output signals. The system is capable of operating in two modes; i.e., a "between lanes" mode (I) in which each sensor is placed on a boundary line adjacent to a monitored traffic lane and an "in lane" mode (II) in which each sensor is placed in a monitored traffic lane. A vehicle passing within a monitored lane will produce a reduction from ambient in magnetic field intensity at a sensor placed in accordance with mode I and an increase from ambient in magnetic field intensity at a sensor placed in accordance with mode II.

In accordance with the preferred embodiment of the invention, the sensors are connected to the electronic unit with opposite polarities for the respective modes I and II, so that the unit need only respond to a single polarity signal regardless of the particular mode of operation.

The electronic unit produces a detect output signal when the sensor output signal applied thereto indicates a field intensity change exceeding a certain threshold level. In accordance with one aspect of the invention, different threshold levels are automatically defined for modes I and II depending upon the polarity of connection between the sensors and the electronic unit. The connection polarity can be established by a manual switch or, as in the preferred embodiment, by the pattern of wiring coupling the sensor wires to a connector.

In accordance with a further important aspect of the invention, the threshold levels are not fixed but rather are established as a percentage of the ambient magnetic field. This feature is important since the magnetic field intensity change produced by a vehicle is substantially proportional to the ambient magnetic field intensity.

In accordance with a further aspect of the invention, servo means are employed to develop a bias signal as a function of the sensed ambient field intensity. The bias signal is fed back to the sensors to force their output to a predetermined level to thus enable the system to automatically adapt to different ambient field conditions.

In accordance with a still further aspect of the invention, peak detection circuit means are utilized for the purpose of adapting to periodic field changes, such as might be produced by 60 hertz sources, to thus prevent the generation of corresponding periodic detect output signals.

BRIEF DESCRIPTION OF THE DRAWINGS

FIGS. 4a–c are diagrams illustrating the operational characteristics of a flux gate magnetometer in accordance with the present invention; and FIGS. 5a–f are waveform diagrams illustrating waveforms occurring at various points in the circuit of FIG. 3.

DESCRIPTION OF THE PREFERRED EMBODIMENTS

Figure 1:
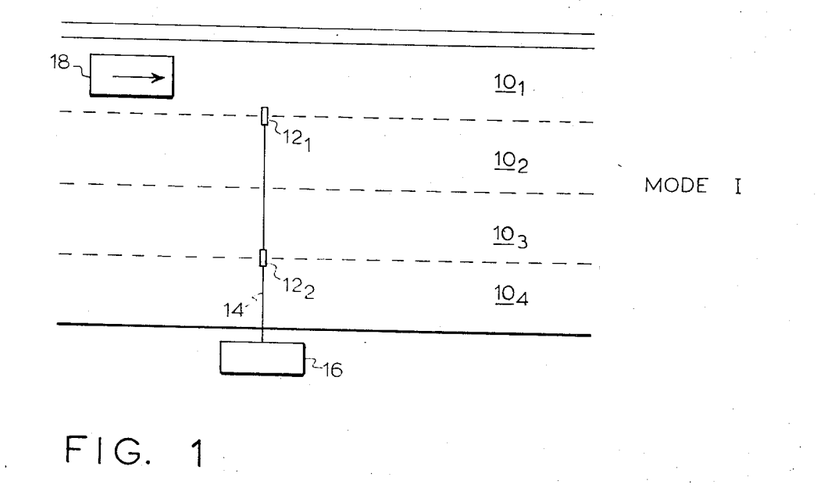
FIG. 1 is a diagrammatic view illustrating the typical placement of sensors in accordance with the operation of the present invention in the "between lanes" mode (I)
Figure 2:
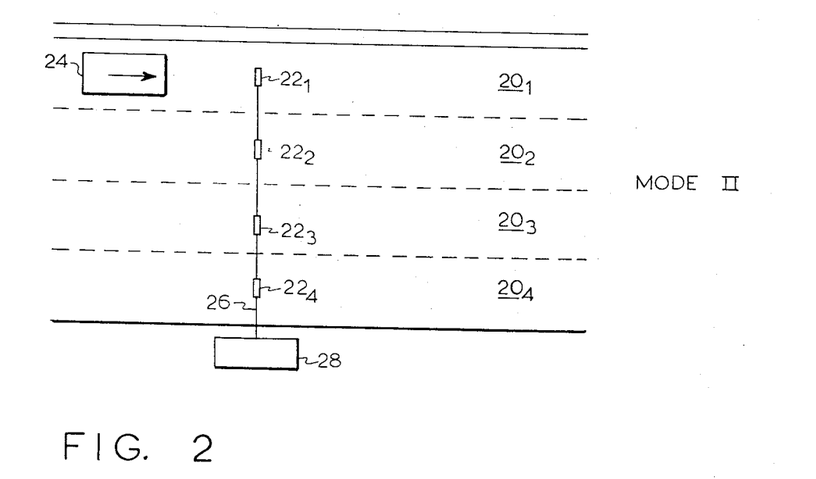
FIG. 2 is a diagrammatic view illustrating the placement of sensors in accordance with the invention in the "in lane" mode (II)

Attention is now called to FIGS. 1 and 2 of the drawings which diagrammatically illustrate the two distinct manners of sensor placement in accordance with the present invention for operation respectively in the two previously mentioned modes. More particularly, FIG. 1 diagrammatically illustrates the placement of sensors for operation in mode I, the "between lanes" mode. Four traffic lanes, respectively identified as $10_1$, $10_2$, $10_3$ and $10_4$ are represented in FIG. 1. In accordance with operational mode I, each sensor is placed so as to monitor either one or two adjacent traffic lanes. Thus, N traffic lanes can be monitored using N/2 sensors where N is even and N/2+½ sensors where N is odd. Two sensors 12 are illustrated in FIG. 1 placed on the boundary lines between lanes 10. The sensors 12 are respectively identified as $12_1$ monitoring lanes $10_1$ and $10_2$ and $12_2$ monitoring lanes $10_3$ and $10_4$. As will be seen hereinafter, the sensors 12 are all connected in common and by a cable 14 to a central electronic unit 16 which typically may reside in a controller cabinet mounted somewhere on the side of the road, usually close to an intersection.

The function of sensors $12_1$ and $12_2$ in accordance with the invention, is to monitor vehicles passing in any of the traffic lanes $10_1$, $10_2$, $10_3$ and $10_4$. As is explained in previously mentioned U.S. Pat. application Ser. No. 125,724, when a vehicle 18 travelling in any one of the monitored traffic lanes passes one of the sensors, it will cause a reduction in magnetic field intensity at the sensor. This reduction in field intensity from an ambient level is indicated in a variation in the sensor output signals communicated to the central unit 16 via cable 14. The central unit 16 monitors signals on the calbe 14 and can determine whether a vehicle has passed by the signal variation.

As will be seen hereinafter, the central unit 16 automatically adapts to the ambient magnetic field intensity and responds to a deviation therefrom as would be caused by a passing vehicle by providing a vehicle detect output signal. If the vehicle 18 stopped and parked adjacent to sensor $12_1$, the unit 16 would, after a short time delay, adapt to the reduced field intensity level produced by the vehicle and thereafter be capable of detecting a vehicle passing alone any of the other traffic lanes $10_2$, $10_3$, or $10_4$.

FIG. 2 diagrammatically illustrates the placement of sensors when operating in the "in lane" mode (II). The four lanes in FIG. 2 are respectively identified as $20_1$, $20_2$, $20_3$, and $20_4$. Sensors $22_1$, $22_2$, $22_3$, $22_4$ which may be identical to the sensors represented in FIG. 1, are mounted in the roadway within the lanes as illustrated in FIG. 2. Again, as is explained in the aforementioned patents and application, when a vehicle 24 passes over a sensor within a monitored traffic lane, it will produce a field intensity increase at that sensor. The field intensity increase will produce a signal variation which will be coupled by a cable 26 to a central unit 28.

Figure 3:
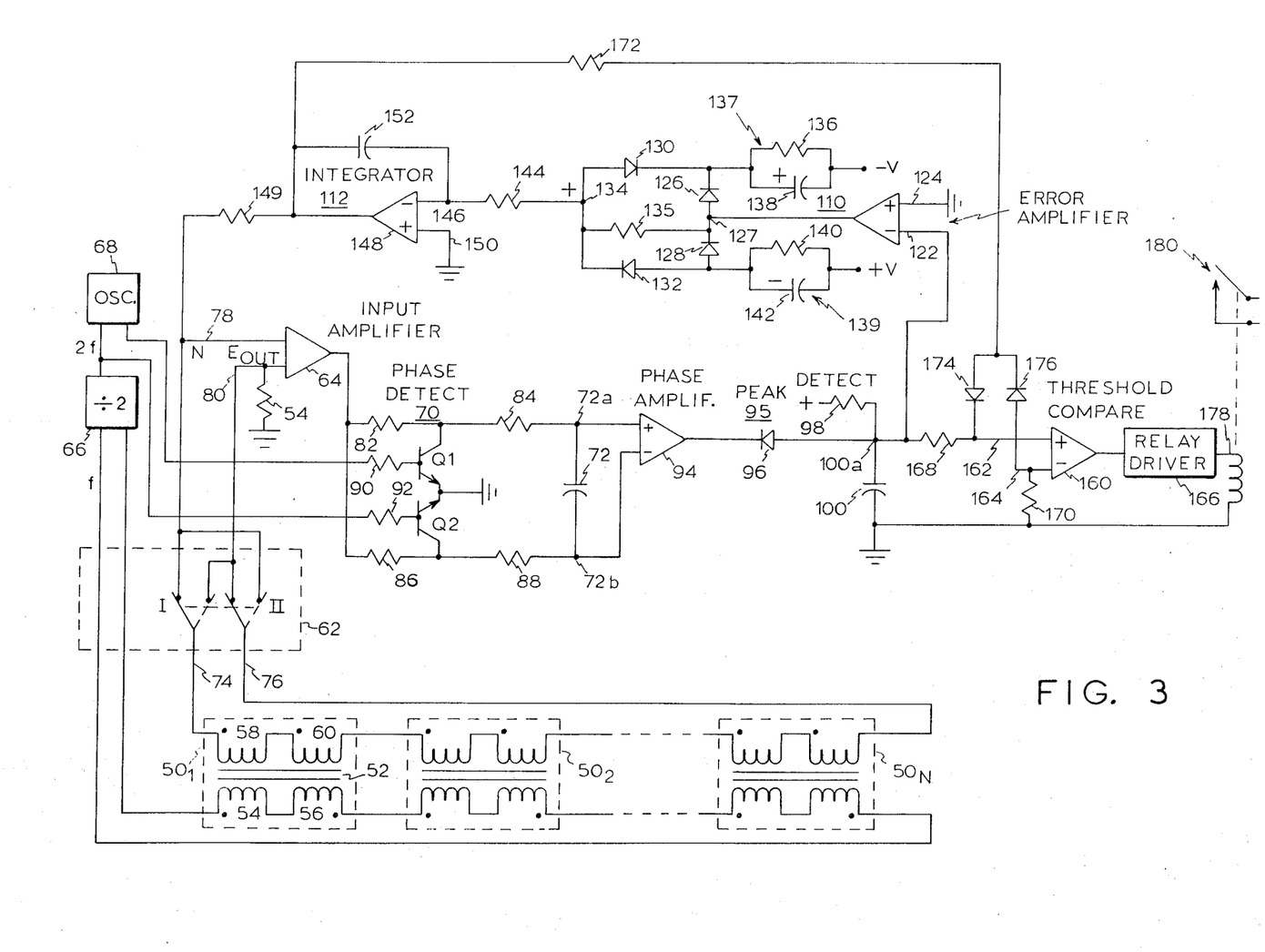
FIG. 3 is a schematic diagram illustrating a preferred embodiment of the present invention.

In accordance with the present invention, the central units 28 and 16 illustrated in FIGS. 2 and 1 respectively constitute a single unit as shown in FIG. 3 herein, which can be selectively operated in either mode I or mode II to respectively detect magnetic field intensity decreases and increases characteristic of a passing vehicle.

Several considerations are pertinent in determining whether a system in accordance with the invention should be operated in mode I or mode II for a particular traffic situation. Briefly, a mode I installation is normally less expensive since fewer sensors and a shorter cable length is required. A mode II installation is more expensive but also usually more accurate in the detection of very slow moving vehicles and special vehicles, such as motorcycles, for example. A mode I situation may be entirely adequate where the objective is detection of vehicle passage and a mode II operation may be preferred where traffic counting, for example, is desired. When very high accuracy counting of all vehicles including, for example, small motor bikes, is required, it may be justified to operate in accordance with mode II utilizing two or more sensors in each traffic lane to be monitored.

In accordance with the preferred embodiment of the present invention, each sensor provides an output signal having a characteristic related to the level of magnetic field intensity through a "sampling area" or "flux collecting aperture" thereof, each sensor being oriented so that the sampling area senses primarily the vertical component of the magnetic field thereat. As is explained in the aforecited U.S. Pat. No. 3,249,915, magnetic field sensing devices generally may be regarded as having such a sampling area or flux collecting aperture, the size and shape of which are dependent upon the characteristics of the particular device. In the preferred embodiment of the present invention, the sensing device comprises a flux gate magnetometer whose sampling area is generally defined by the nature, size and shape of the magnetometer core structure and any additional flux collecting elements, if any, together with the coils surrounding the core structure.

More particularly, as has been recognized and explained in the aforecited U.S. Pat. No. 3,249,915, a magnetically permeable mass, such as is found in conventional vehicles, will concentrate the earth's magnetic field lines therethrough to thus increase magnetic field intensity above and below the vehicle. More accurately, it can be said that the presence of a magnetically permeable mass on a specified area of the earth's surface will increase the magnetic field intensity within a volume constituting the projection of the specified area in a direction determined by the magnetic field inclination at that site. On the other hand, the magnetic field intensity will be reduced immediately outside of that volume. Thus, in order to detect a passing vehicle when the apparatus of the invention is operated in mode I, the central electronic unit looks for a reduction in field intensity and in mode II, for an increase in field intensity.

Attention is now called to FIG. 3 which illustrates a schematic diagram of a preferred embodiment of a vehicle detection system in accordance with the present invention. The embodiment of FIG. 3 preferably employs a plurality of flux gate magnetometers 50 (respectively identified as $50_1$–$50_N$) as the previously mentioned magnetic field sensors. As is explained in detail in the aforecited U.S. Pat. No. 3,249,915, a flux gate magnetometer 50 can be comprised of a magnetically saturable element 52 forming a core upon which a plurality of windings 54, 56, 58 and 60 are placed. The windings 54 and 56 comprise primary or input windings and are wound on the core 52 with opposite orientations, as expressed by the orientation representing dots. The windings 58 and 60 comprise secondary or output windings and, as represented by the orientation dots, are wound on the core 52 with similar orientations.

The secondary windings 58, 60 of all of the magnetometers 50 are connected in series and through a switching or connector unit 62 to the input terminals of an input amplifier 64. As will be explained in greater detail hereinafter, in use, the sensors 50 shown in FIG. 3 are placed in the roadway in accordance with either FIG. 1 or FIG. 2. The circuitry shown in FIG. 3 above the switching or connector unit 62 constitutes the circuitry of the previously mentioned central electronic unit which is normally housed in a roadside cabinet.

Similarly, the primary windings 54, 56 of all of the magnetometers 50 are connected in series as shown in FIG. 3. As is explained in the cited U.S. Pat. No. 3,249,915, each flux gate magnetometer 50 will provide an output signal on its secondary windings 58, 60 having a frequency $2f$, equal to twice the frequency $f$ of the energizing signal applied to the primary windings 54, 56. In accordance with the preferred circuit arrangement of FIG. 3, the series connected primary windings are connected across the output of a divide by 2 frequency divider 66 providing an excitation signal at frequency $f$. The frequency divider 66 is in turn driven by an oscillator 68 providing a signal at frequency $2f$.

Figures 4A, 4C, 5A, 5F:
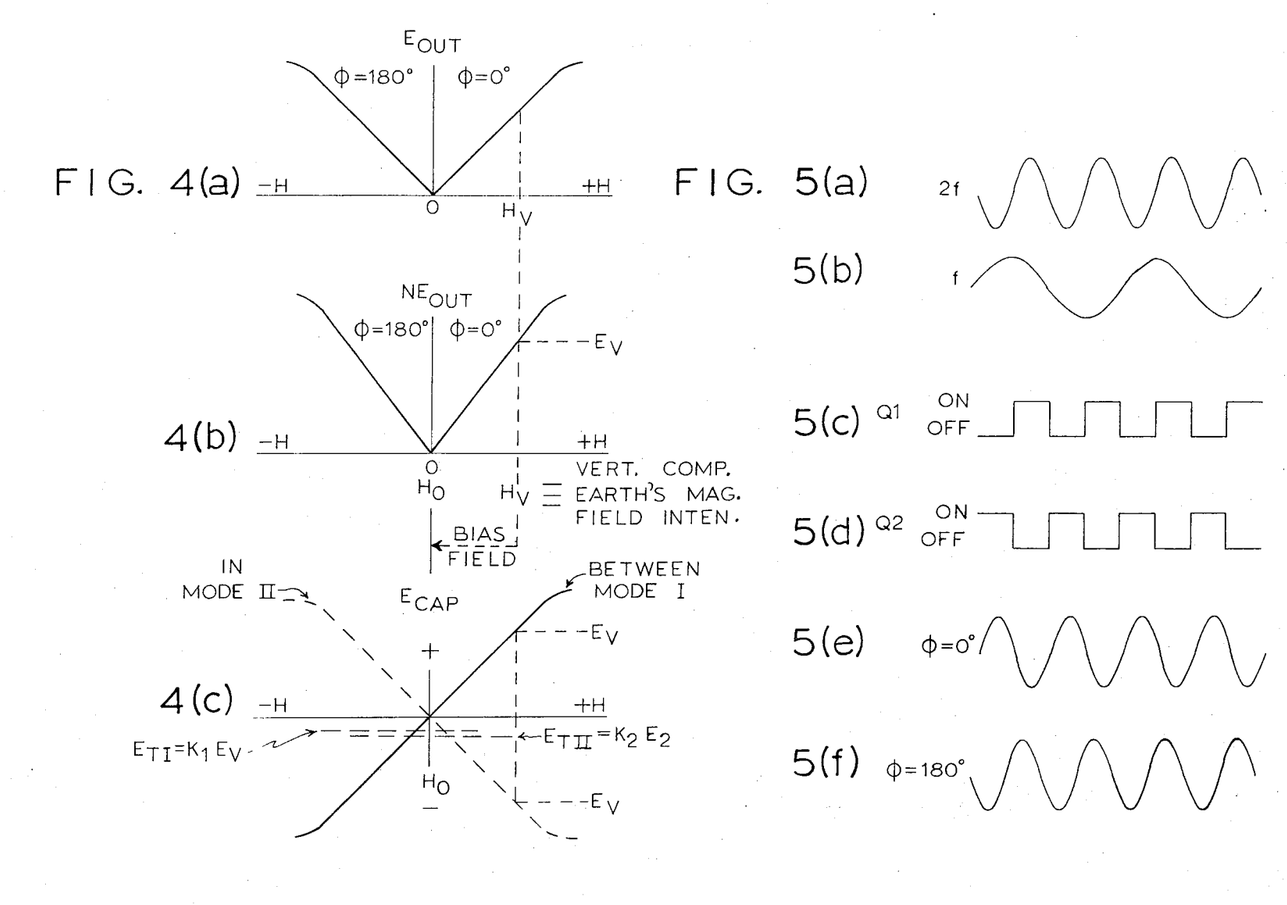

Attention is now diverted to FIG. 4(a) which depicts the V-shaped characteristic of a typical flux gate magnetometer which is described in "Non-linear Magnetic Control Devices" by William A. Geyger, McGraw-Hill, Inc. Page 343. The characteristic depicted in FIG. 4(a) shows that the magnetometer produces an output voltage $E_{out}$ as a function of the magnitude of the sensed field intensity H. It will be noted that the characteristic is substantially symmetric and that as the field intensity is increased from zero in either direction, the magnetometer output voltage increases symmetrically and substantially linearly. As previously noted, the magnetometer output signal $E_{out}$ is an AC signal of frequency $2f$ (FIG. 5(a)) twice that of its energizing signal $f$ (FIG. 5(b)). Moreover, as is well known, the phase of the output signal $E_{out}$ is dependent upon the direction of the sensed magnetic field intensity along the magnetometer core. With reference to FIG. 4(b), it will be assumed herein that the signal $E_{out}$ is in phase (i.e. $\phi = 0°$) with the second harmonic reference signal $2f$ supplied by oscillator 64 if the net field along the magnetometer core is in the same direction as the earth's field, (which will henceforth be assumed to be positive) but is 180° out of phase (i.e. $\phi = 180°$) with that reference signal if the net field intensity is in an opposite direction (henceforth assumed to be negative). As will be seen hereinafter, the circuit arrangement of FIG. 3 includes a phase detector for comparing the phase of the magnetometer output signal with the phase of the second harmonic reference signal $2f$ to in effect determine the direction of magnetic field intensity. This determination establishes the polarity of a DC voltage which is then developed based upon the amplitude of the magnetometer output signal which of course is related to the sensed magnetic field intensity as represented in FIG. 4(b).

More particularly, the series connected output windings 58, 60 are connected through the connector unit 62 to be discussed hereinafter, across the input of a differential amplifier 64. The output of the amplifier 64 is connected to the input of a phase detection circuit 70. The phase detection circuit 70, which functions to develop the DC voltage indicative of magnetic field direction and magnitude, essentially consists of first and second transistor switches Q1 and Q2 which are alternately enabled by the second harmonic reference signal provided by the oscillator 68 as depicted in lines (c) and (d) of FIG. 5. The switches Q1 and Q2 control the charging of a capacitor 72.

The switching or connector unit 62 serves to interconnect the output winding terminals 74, 76 and the input terminals 78, 80 of the amplifier 64 so that regardless of whether the system is operating in mode I or mode II, passage of a vehicle past a sensor will produce the same polarity charging of capacitor 72. The unit 62 is illustrated as comprising a double-pole, double-throw switch which, when thrown to the left to define mode I, connects terminals 74 and 78 and terminals 76 and 80. When thrown to the right to defind mode II, unit 62 connects terminals 76 and 78 and terminals 74 and 80.

Consider for the moment that the magnetometers of FIG. 3 are biased to the zero intensity point as represented in FIG. 4(a). With the sensors placed in accordance with mode I, a passing vehicle will produce a reduction in field intensity to generate a magnetometer output signal of $\phi = 180°$ and with the sensors placed in accordance with mode II, a passing vehicle will produce a field intensity increase to generate a magnetometer output signal of $\phi = 0°$. By reversing the polarity of connection, in the unit 62 for the two operational modes, the input signal applied to amplifier 64 will be of the same phase in response to a passing vehicle for both modes I and II, which phase will henceforth be assumed to be $\phi = 180°$. The switches Q1 and Q2 control the charging of capacitor 72 such that if the magnetometer output voltage is in phase ($\phi = 0°$), a positive voltage will be developed across the capacitor terminals 72a to 72b. On the other hand, if the magnetometer output voltage is out of phase ($\phi = 180°$), then a negative voltage will be developed across the capacitor terminals 72a and 72b. Thus, since a passing vehicle in mode I will produce a field reduction and in mode II a field increase, a passing vehicle can be detected regardless of mode by an appropriate negative going voltage on terminal 72(a) relative to terminal 72(b).

Considering the phase detection circuit 70 in more detail, it will be seen to comprise a pair of series resistors 82 and 84 connecting the output differential amplifier 64 to the capacitor first terminal 72a. A second path comprised of series resistors 86 and 88 connects the output of amplifier 64 to the capacitor second terminal 72b. The emitters of transistor switches Q1 and Q2 are connected in common to a source of DC voltage. The collector of transistor Q1 is connected to the junction between resistors 82 and 84 and the collector of transistor Q2 is connected to the junction between resistors 86 and 88. The bases of transistors Q1 and Q2 are respectively connected through resistors 90 and 92 to complimentary output terminals of the oscillator 68 so as to be alternately switched, as represented in lines (c) and (d) of FIG. 5. When the transistor switch Q2 conducts ("on"), the output of amplifier 64 is steered through the path comprised of resistors 82 and 84 to capacitor terminal 72a. If the output of amplifier 64 is in phase (line (e), FIG. 5), the capacitor 72 will be charged positive from terminal 72a to 72b. If the output of amplifier 64 is out of phase (line (f), FIG. 5), then the capacitor 72 will be charged negative, i.e. from terminal 72a to 72b.

The DC voltage produced across capacitor 72 is applied through amplifier 94 to a peak detector circuit 95 comprised of diode 96, resistor 98 and capacitor 100. The purpose of circuit 95 is to mask out the effects of periodic magnetic field changes as might be caused by some 60 hertz source. More particularly, as will be seen hereinafter, inclusion of the peak detector 95 enables the adoption of a magnetometer operating point based in part on the peak of the periodic signal to thereby prevent the periodic signal from producing a vehicle detect output signal. In order to understand the operation of the peak detector 95, again assume a zero ambient intensity field and a resulting zero DC voltage across capacitor 72. Now assume a periodic 60 hertz field change. The terminal 72a will alternately swing positive and negative. Due to the inclusion of diode 96 only the negative swings will be coupled to terminal 100a of capacitor 100, which will assume a DC voltage substantially equal to the negative peak of the voltage swing.

A zero intensity ambient field has previously been assumed for purposes of explanation. In fact, operation of the invention depends upon the existence of some ambient field which a passing vehicle can then distort and it is this distortion or change from ambient condition which is detected in order to indicate the vehicles presence. In accordance with the preferred embodiment of the invention, a servo loop, including an error amplifier 110 and integrator 112, is utilized to develop a bias signal to establish a magnetometer operating point which substantially corresponds to the null or zero intensity ambient field condition previously assumed.

Again, calling attention to FIG. 4(a), the point $H_V$ represents a typical value of vertical component of the earth's magnetic field intensity. For reasons having to do with stability and linearity, it is normally desirable that the magnetometer be operated at a point close to the axis of symmetry of the V-shaped characteristic. This can be accomplished by producing a bias field along the magnetometer axis in a direction opposite to the earth's field. In accordance with the present invention, the N magnetometers in a series string are all biased by a series bias current driven through the magnetometer secondary windings to an operating point Ho (FIG. 4(b)), associated with an output voltage Eo, where Eo is preferably close to null.

FIG. 4(c) illustrates the voltage (Ecap) developed across the capacitor 72 as a function of sensed field intensity for modes I and II. Note that the voltage Ecap is substantially linearly related to field intensity H over a wide region and that it is negative for both field intensity reduction from Ho in mode I and field intensity increases from Ho in mode II. It can also be seen that Ecap is positive for the opposite conditions, i.e. increases from Ho in mode I and reductions from Ho in mode II. The voltage developed across peak detector capacitor 100 will correspond to the voltage across capacitor 72, i.e. Ecap, disregarding periodic sources.

The operating point Ho depicted in FIG. 4b and c is established by the previously mentioned servo loop comprised of error amplifier 110 and integrator 112. Briefly, the servo loop responds to the potential appearing at terminal 100a of peak detector capacitor 100 to develop a bias signal out of the integrator 112, which is applied to the magnetometer secondary windings 58 and 60, to generate a bias magnetic field which opposes and substantially nulls the earth's magnetic field. More particularly, capacitor terminal 100a is connected to a first input terminal 122 of error amplifier 110. A second input terminal 124 of amplifier 110 is connected to a predetermined voltage source, such as ground. The output terminal 127 of amplifier 110 is connected to oppositely poled diodes 126 and 128. Diodes 126 and 128 are respectively connected through diodes 130 and 132 to a common junction 134. Also, a very high impedance resistor 135 connects terminal 127 to junction 134. The junction between diodes 126 and 130 is connected to a source of negative potential −V through a first time delay circuit 137 comprised of resistor 136 and capacitor 138 connected in parallel. The junction between diodes 128 and 132 is connected to a source of positive potential +V through a second time relay circuit 139 comprised of a resistor 140 and a capacitor 142 connected in parallel.

The junction 134 between diodes 130 and 132 is connected through resistor 144 to the inverting input terminal 146 of amplifier 148. The non-inverting input terminal 150 of amplifier 148 is connected to ground. The output of amplifier 148 is connected through a feedback capacitor 152 to the input terminal 146 to form an integrator. In addition, the output of amplifier 148 is connected through resistor 149 to the serially connected magnetometer secondary windings through the switching or connector unit 62. The opposite end of the serially connected secondary windings is connected through a resistor 154 to ground.

In operation, the servo loop functions to force the potential at capacitor terminal 100a to ground. This, of course, will occur only when the bias current supplied to the magnetometer secondary windings is adequate to substantially null the magnetic field sensed by the magnetometer; i.e., at the operating point Ho represented in FIG. 4(b).

When the equipment illustrated in FIG. 3 is first turned on, the earth's vertical field component sensed by the magnetometers and represented in FIG. 4(b) by $H_V$, will produce a DC voltage $E_V$ at capacitor terminal 100a. The polarity of the DC voltage produced at 100a will depend upon the connection polarity established by the switching or connector unit 62. That is, referring to FIG. 4(c), it will be noted that if the "between lanes" mode I is defined, $E_V$ will be positive and if the "in lane" mode II is defined, $E_V$ will be negative. The potential developed at terminal 100a is coupled to input terminal 122 of amplifier 110 which introduces a polarity inversion to initially drive terminal 127 negative if mode I is defined and positive if mode II is defined.

In order to understand the operation of the servo loop, first consider a hypothetical situation in which the unit is turned on in the absence of an external magnetic field. In this case, point 127 will be substantially at ground (disregarding noise and other spurious signals) and point 134 will likewise be close to ground.

Now considering the actual situation in which when the unit is turned on, the magnetometers immediately sense the positive magnetic field $H_V$. In mode I, point 127 will go negative thus forward biasing diode 128 and back biasing diode 132. This action essentially isolates the time delay circuit 139 from junction 134 and charges capacitor 142 to a maximum negative voltage. The potential on junction 134 goes negative as a consequence of the path through resistor 135 to terminal 127 and the path through diode 130 and resistor 136 to the source of negative potential −V.

The negative potential at point 134 will produce a rise in the positive direction of the potential out of amplifier 148. The output of amplifier 148 develops a magnetometer bias current opposing the earth's field. As the output of amplifier 148 continues to rise, the servo action will rapidly compensate for the earth's field, reducing the potential at capacitor terminal 100a toward ground. When the potential at point 100a reaches ground, the output of amplifier 148 will stop rising and circuit is then in a quiescent state ready to detect a vehicle. While in this quiescent state, the potentials at points 100a, 127, 134 will be substantially at ground and the voltage developed across capacitor 152 will sustain the bias current to the magnetometers to maintain the $H_o$ operating point. Due to component drift and spurious external noise effects, it will be appreciated that as a practical matter, the servo action will continue during this quiescent state and that the point 100a will drift slightly and the capacitor 152 will charge and discharge as the operating point $H_o$ is essentially maintained.

Now considering mode II during turn on, when point 127 goes positive, point 134 again follows as a consequence of diode 126 becoming forward biased and diode 130 becoming back biased. The positive potential at point 134 will produce a negative going potential out of amplifier 148 to develop a magnetometer bias current opposite to the bias current developed during mode I turn on. However, since the configuration of the switching unit 62 will be opposite from mode I, the bias current produced as a consequence of the negative going potential out of amplifier 148 will also oppose the earth's field to reduce the potential at capacitor terminal 100a toward ground. When the output of amplifier 148 goes sufficiently negative to force the potential at point 100a to ground, the circuit is then in a quiescent state ready to detect a vehicle. While in this mode II quiescent state, the potentials at points 100a, 127, 134 will be at substantially ground and the voltage developed across capacitor 152 will sustain the bias current to the magnetometers to maintain the $H_0$ operating point.

From the foregoing, it should now be recognized that the mode I and mode II quiescent states differ in the potential polarity supplied at the output of amplifier 148 and developed across capacitor 152. As previously pointed out, although this bias potential is opposite in modes I and II, it will produce the common effect of opposing the earth's magnetic field due to the opposite connection polarity in unit 62 for the respective modes. In the quiescent state in both modes, the magnitude of the potential available at the output of amplifier 148 will be indicative of the level of ambient field intensity to which the circuit is adapted. This field intensity level is employed in accordance with the invention to develop a voltage threshold level which a change in the sensed field must exceed in order for the circuit to develop a vehicle detect output signal.

More particularly, a vehicle detect output signal is developed in accordance with the present invention by a threshold amplifier 160. Threshold amplifier 160 has first and second input terminals 162 and 164 and provides a vehicle detect output signal to relay driver 166 when the potential on input terminal 162 is more negative than the potential on input terminal 164. Input terminal 162 is connected through resistor 168 to the previously referred to capacitor terminal 100a which indicates the level of magnetic field intensity sensed by the magnetometers. Input terminal 164 is connected through resistor 170 to ground.

First and second thresholds (represented as $E_{TI}$ and $E_{TII}$ in FIG. 4(c)) each of which constitutes a fixed percentage of the ambient field intensity are established by coupling the output of amplifier 148 via resistor 172 to the threshold amplifier input terminals 162 and 164. Resistor 172 is connected through diode 174 to input terminal 162 and through diode 176 to input terminal 164.

The diodes 174 and 176 effectively act as switches to establish a different threshold for the two operational modes. It will be recalled that during the mode I quiescent state, the output of amplifier 148 is positive and therefore diode 174 will be forward biased and diode 176 will be back biased. With diode 174 forward biased, resistors 172 and 168 constitute a voltage divider establishing a certain positive potential at amplifier input terminal 162 which is a percentage of the sensed ambient field and which defines the threshold level $E_{TI}$. The particular percentage of course depends upon the ratio of the values of resistors 172 and 168. Since diode 176 is back biased during the mode I quiescent state, amplifier input terminal 164 will be at ground. Accordingly, in order for the potential at terminal 162 to go more negative than the potential on input terminal 164 to generate the vehicle detect output signal, it is necessary for the capacitor terminal 100a to go sufficiently negative to overcome the positive potential established on terminal 162 by resistors 172 and 168.

The threshold $E_{TII}$ for a mode II operation is defined by resistors 172 and 170 acting as a voltage divider to establish a negative potential on amplifier input terminal 164. It will be recalled that during the mode II quiescent state, amplifier 148 will provide a negative output potential indicative of the ambient field intensity. This negative potential will establish a negative threshold potential at the input terminal 164 via forward biased diode 176. The effect of this negative potential established on input terminal 164 is to establish a threshold such that the capacitor terminal 100a must go more negative than that threshold in order to cause threshold amplifier 160 to generate a vehicle detect output signal.

The value of series resistor 149 is selected so as to be much greater than the sum of the resistance in the magnetometer secondary windings and as a consequence, the bias potential at the output of amplifier 148 will depend almost solely on the average magnetic field sensed by the N magnetometers and be essentially independent of the value of N. Since the threshold levels $E_{TI}$ and $E_{TII}$ are developed as a function of the bias potential, they too are independent of the value of N. Therefore, the sensitivity per sensor, or in other words the field changed that must be sensed by a single sensor to cause a vehicle detect output signal is independent of the value of N. It is adventageous however for the level of threshold $E_{TI}$ and $E_{TII}$ to depend on the average magnetic field since a field change produced by a passing vehicle is essentially directly related to the magnitude of the magnetic field.

The vehicle detect output signal developed by threshold amplifier 160 is applied to relay driver 166 to energize relay 178 and close contacts 180 connected to some utilization device, not shown.

From the foregoing, it will be recognized that in the operation of the circuit of FIG. 3, after turn on, in either mode I or II, a quiescent state will be established in which capacitor terminal 100a will be at substantially ground potential with a positive bias potential being supplied at the outputs of amplifier 148 in mode I and a negative potential being supplied in mode II. In either mode, it will be recalled that a vehicle passing a sensor in a monitored lane will produce a negative going potential at the capacitor terminal 100a. If this negative going potential exceeds the thresholds respectively established for modes I and II, the relay coil 178 will be energized.

Whether or not a voltage deviation at capacitor terminal 100a is sufficient to produce a vehicle detect output signal at amplifier 160, it does in any event produce a correction within the servo loop to maintain the operating point $H_0$. Since it is desired that the system adapt to long term field changes, such as would be represented by a parked vehicle, and not to short term field changes such as would be represented by a passing vehicle, the time delay circuits 137 and 139 are incorporated in the servo loop. The first time delay circuit 137 comprised of resistor 136 and capacitor 138 and the second time delay circuit 139 comprised of resistor 140 and capacitor 142 have previously been mentioned. While in the quiescent state, due to component drift and spurious external noise, error amplifier 110 will alternately saturate in positive and negative directions, causing the servo loop to continually correct to maintain the $H$ operating point. On each occurrence that the output of amplifier 110 goes negative, diode 128 conducts more heavily to develop a negative charge in capacitor 142 from the junction between diodes 128 and 132 to ground. A positive charge is similarly developed across capacitor 138 from the junction between diodes 126 and 130 to ground. Thus, in the quiescent state, for both modes I and II, capacitors 138 and 142 will charge in accordance with the polarities indicated in FIG. 3. With capacitors 138 and 142 charged as shown, point 134 will be effectively isolated from both time delay circuits 137 and 139 and the potential thereat will be determined by the potential at Terminal 127 through the very high impedance resistor 135. When a voltage deviation at capacitor terminal 100a is applied to the input of error amplifier 110, the charge on capacitors 138 and 142 will prevent the potential at point 134 from changing rapidly. More particularly, assume initially that the potential at capacitor terminal 100a goes negative. This will produce a positive going potential at point 127 which will not immediately produce a very rapid change at the output of amplifier 148 because of the very high impedance of resistor 135. However, after the negative potential across capacitor 142 discharges (through the resistor 140 towards the source of positive potential) sufficiently to forward bias diode 132 then the output of amplifier 148 can change rapidly. This delay is normally selected to be on the order of 2 seconds so that passing vehicles cannot produce a significant change in operating point.

On the other hand, if the potential at capacitor terminal 100a went positive, this would provide a negative potential at point 127. The potential at point 134 however does not significantly change until capacitor 138 discharges via resistor 136 to the source of negative potential. After capacitor 138 discharges, diode 130 will be forward biased, thereby permitting the potential on junction 134 to change rapidly.

Thus, it should be appreciated that when in the quiescent state for either mode of operation, if a change in sensed field intensity occurs, the same servo action will take place as previously described for turn on, but this action will be delayed by a time interval determined by the discharge rate of the capacitors 138 and 142.

What is claimed is:

1. Apparatus for interpreting signals appearing across first and second output terminals of a magnetic field sensor producing an output signal representative of the intensity of magnetic field sensed by said sensor, said apparatus comprising:
   first and second apparatus input terminals adapted to be selectively connected to said first and second sensor output terminals in accordance with first and second opposite polarities;
   circuit means connected to said apparatus input terminals for producing a DC voltage representative of the intensity of magnetic field sensed by said sensor;
   servo means responsive to said DC voltage producing a bias signal at said apparatus input terminals for application to said sensor output terminals for forcing said DC voltage to a predetermined value;
   threshold means for producing a first threshold signal having a value displaced from said predetermined value by an amount substantially proportional to the field intensity sensed by said sensor in the absence of said bias signal; and
   comparison means for comparing the values of said DC voltage and said first threshold signal.

2. The apparatus of claim 1 wherein said servo means includes error amplifier means having a first input terminal connected to a voltage source of said predetermined value, a second input terminal connected to said DC voltage, and an error voltage output terminal.

3. The apparatus of claim 2 wherein said servo means further includes integrator means producing said bias signal and having input means connected to said error voltage output terminal and output means connected to said apparatus input terminals.

4. The apparatus of claim 3 wherein said threshold means is connected to said integrator means output means and responsive to said bias signal produced thereat.

5. The apparatus of claim 4 wherein said threshold means includes means for developing first and second threshold signals, each constituting a predetermined percentage of said bias signal.

6. The apparatus of claim 5 including a magnetic field sensor having first and second output terminals;
   connector means having at least first and second contacts detachably connectable to said apparatus first and second input terminals and third and fourth contacts respectively connected to said first and second contacts; and
   means connecting said sensor first and second output terminals to said third and fourth contacts.

7. The apparatus of claim 6 including means responsive to said first and second output terminals being connected respectively to said third and fourth contacts for coupling said first threshold signal to said comparison means and means responsive to second and first output terminals being connected respectively to said third and fourth contacts for coupling said second threshold signal to said comparison means.

8. The apparatus of claim 5 including a magnetic field sensor having first and second output terminals;
   means responsive to said first and second output terminals being connected respectively to said first and second apparatus input terminals for coupling said first threshold signal to said comparison means and to said first and second output terminals being connected respectively to said second and first apparatus input terminals for coupling said second threshold signal to said comparison means.

9. The apparatus of claim 1 including a magnetic field sensor comprising a flux gate magnetometer providing an AC output signal of frequency $2f$ and phase $\phi_1$, in response to a magnetic field intensity in a first direction sensed by said sensor and of frequency $2f$ and phase $(\phi_1+180°)$ in response to a magnetic field intensity in an opposite direction sensed by said sensor;
   means providing a reference signal of frequency $2f$ and phase $\phi_1$; and wherein
   said circuit means includes means for determining whether said AC output signal is in phase or out of phase with respect to said reference signal.

10. The apparatus of claim 9 wherein said circuit means for producing said DC voltage includes means responsive to the amplitude of said AC output signal for developing the magnitude of said DC voltage and responsive to the phase of said AC output signal for developing the polarity of said DC voltage.

11. The apparatus of claim 10 wherein said circuit means further includes a peak detection means for producing said DC voltage based on the peak levels of periodic signals applied to said apparatus input terminals.

12. A system for monitoring a region of a traffic lane to detect the passage of a vehicle therethrough, said system comprising:
- sensor means defining a sampling area mounted adjacent to but outside of said region for producing an output signal indicative of the level of magnetic field intensity through said sampling area;
- bias means responsive to said sensor means output signal for producing a magnetic bias field through said sampling area to force said sensor means output signal to a predetermined value;
- means producing a threshold signal having a value displaced from said predetermined value by an amount substantially proportional to the level of magnetic field intensity through said sampling area exclusive of said magnetic bias field; and
- comparison means for comparing the values of said sensor means output signal and said threshold signal.

13. The system of claim 12 wherein said sensor means comprises a flux gate magnetometer providing an AC output signal of frequency $2f$ and phase $\phi_1$, in response to a magnetic field intensity in a first direction through said sampling area and of frequency $2f$ and phase $(\phi_1+180°)$ in response to a magnetic field intensity in an opposite direction through said sampling area;
- means providing a reference signal of frequency $2f$ and phase $\phi_1$; and including
- circuit means for developing a DC voltage whose magnitude is related to the amplitude of said AC output signal and whose polarity is dependent on whether said AC output signal is in phase or out of phase with respect to said reference signal.

14. The system of claim 13 wherein said bias means includes:
- an amplifier responsive to said DC voltage and a voltage source of said predetermined value for producing an error voltage; and
- integrator means responsive to said error voltage for developing a bias signal to produce said magnetic bias field.

15. The system of claim 14 wherein said means producing a threshold signal comprises voltage divider means responsive to said bias signal.

16. The system of claim 12 wherein said bias means includes time delay means for causing variations in said bias field to lag variations in said sensor output signal.

17. A system for monitoring a region of a traffic lane to detect the passage of a vehicle therethrough, said system comprising:
- sensor means defining a sampling area mounted in said region for producing an output signal indicative of the level of magnetic field intensity through said sampling area;
- bias means responsive to said sensor means output signal for producing a magnetic bias field through said sampling area to force said sensor means output signal to a predetermined value;
- means producing a threshold signal having a value displaced from said predetermined value by an amount substantially proportional to the level of magnetic field exclusive of said magnetic bias field; and
- comparison means for comparing the values of said sensor means output signal and said threshold signal.

18. The system of claim 17 wherein said sensor means comprises a flux gate magnetometer providing an AC output signal of frequency $2f$ and phase $\phi_1$, in response to a magnetic field intensity in a first direction through said sampling area and of frequency $2f$ and phase $(\phi_1+180°)$ in response to a magnetic field intensity in an opposite direction through said sampling area;
- means providing a reference signal of frequency $2f$ and phase $\phi_1$; and including
- circuit means for developing a DC voltage whose magnitude is related to the amplitude of said AC output signal and whose polarity is dependent on whether said AC output signal is in phase or out of phase with respect to said reference signal.

19. The system of claim 18 wherein said bias means includes;
- an amplifier responsive to said DC voltage and a voltage source of said predetermined value for producing an error voltage; and
- integrator means responsive to said error voltage for developing a bias signal to produce said magnetic bias field.

20. The system of claim 19 wherein said means producing a threshold signal comprises voltage divider means responsive to said bias signal.

21. The system of claim 17 wherein said bias means includes time delay means for causing variations in said bias field to lag variations in said sensor output signal.

* * * * *